Figure 1:
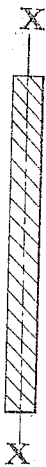

No. 859,753. PATENTED JULY 9, 1907.
J. DIAMANT.
PROCESS FOR THE BUILDING UP OF SPONGY LEAD PLATES FOR ELECTRIC STORAGE BATTERIES.
APPLICATION FILED NOV. 28, 1906.

Witnesses

Inventor
Julius Diamant
By
H.B. Willson & Co
Attorneys

UNITED STATES PATENT OFFICE.

JULIUS DIAMANT, OF GYÖR, AUSTRIA-HUNGARY.

PROCESS FOR THE BUILDING UP OF SPONGY LEAD PLATES FOR ELECTRIC STORAGE BATTERIES.

No. 859,753.　　　　　Specification of Letters Patent.　　　　　Patented July 9, 1907.

Application filed November 28, 1906. Serial No. 345,482.

*To all whom it may concern:*

Be it known that I, JULIUS DIAMANT, a subject of the King of Hungary, residing at Györ, in the Empire of Austria-Hungary, have invented new and useful Improvements in Processes for the Building up of Spongy Lead Plates for Electric Storage Batteries, of which the following is a specification.

This invention relates to a process for the building up of spongy lead plates for electric storage batteries. The capacity of storage batteries which are constructed of the type of the so-called "mass" plates, depends upon the porosity of the active material. Moreover negative spongy lead plates show a re-action whereby their porosity, after a shorter or longer period of use, is reduced especially at the surface of the plate and thereby their capacity is reduced, even while the interior of the mass still retains the original capacity, because the same can no longer be effective in consequence of the shutting out of the electrolyte by reason of the superficial dense layer. Experiments have shown that such plates rendered dense on their surface can again attain their original capacity, if the dense surface be transferred into the interior of the mass, and in place thereof for the outsides of the plates a sectional surface obtained from the interior of the plate can be exposed.

The process is carried out in its simplest form when the spongy lead plate possesses originally one or more sectional planes parallel to its surface, because in this case the interchange of the dense surface layer with a surface taken from the interior of the plate, by simply turning it round or exchanging the separate plates can be effected. These plates thus recover not only the original capacity but there also occurs in the mass, as the new surface gradually becomes denser, a regeneration of the first condensed surface which is now placed in the interior of the plate, so that this latter, when it becomes again necessary to expose a new plate surface, can be again turned to the outside. It is also advantageous not to wait for the interchange of the surfaces until the condensation thereof is rendered perceptible by a remarkable decrease in the capacity, but one can already cause a regeneration of the surface by placing the same in the interior of the plate so that the results of the condensation of the surface, such as the contraction of the active material and the appearance of symptoms of sulfating, may be prevented.

In the manner above described the life of the spongy lead plates may be rendered completely independent of the appearance of condensing or of the drawbacks associated therewith.

In order to render the process clear reference will be made to the accompanying drawing.

Figure 1 represents a section of an ordinary spongy plate which is to be regenerated; Figs. 2, 3, 4 and 5 represent transverse vertical sections of the plate showing various arrangements of the sections thereof.

Figure 2:
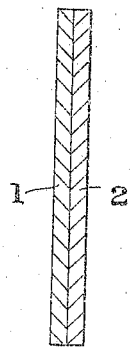
Figure 3:
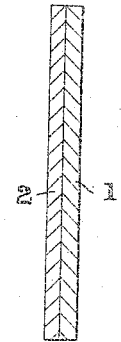

The form shown in Fig. 1 is first cut from a central plane indicated by the line $x$—$x$ into two parts or sections or the plate may be initially made up from two sections indicated in Fig. 2. When the plate formed in either way is to be regenerated it is divided and the relative order of the sections is changed to bring the internal surface to the outside and vice versa. The sections 1 and 2 as shown in Fig. 2 are divided and rearranged in the order 2, 1, as shown in Fig. 3 being again altered when required and so on.

Figure 4:
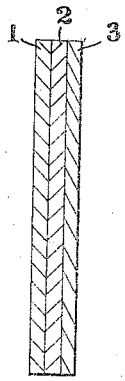
Figure 5:
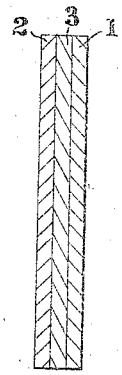

The plates are divided into any number of sections, for instance, 1, 2, 3 as shown in Fig. 4 which may be rearranged to 2, 3, 1 as shown in Fig. 5 to bring fresh surface to the outside at each rearrangement.

What I claim is:

1. A process for prolonging activity of spongy lead plates for electric storage batteries which consists in dividing the plates into sections and then varying the relative order of the sections to bring the internal surfaces to the outside and the deteriorated surface to the inside.

2. A process for prolonging the activity of spongy lead plates for electric storage batteries which consists in dividing the plates into sections and varying the relative order of the sections before the exposed surface shows signs of sulfating so as to bring the internal surface to the outside and the deteriorated surface to the inside.

In testimony whereof I have signed my name to this specification in the presence of two subscribing witnesses.

JULIUS DIAMANT.

Witnesses:
　ALVESTO S. HOGUE,
　AUGUST FUGGER.